(12) United States Patent
Yamashita et al.

(10) Patent No.: US 11,210,948 B2
(45) Date of Patent: Dec. 28, 2021

(54) VEHICLE AND NOTIFICATION METHOD

(71) Applicant: TOYOTA JIDOSHA KABUSHIKI KAISHA, Toyota (JP)

(72) Inventors: Keiji Yamashita, Nisshin (JP); Koichi Ikemoto, Nagoya (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/578,923

(22) Filed: Sep. 23, 2019

(65) Prior Publication Data

US 2020/0175866 A1 Jun. 4, 2020

(30) Foreign Application Priority Data

Dec. 4, 2018 (JP) .............................. JP2018-227182

(51) Int. Cl.
*G08G 1/123* (2006.01)
*H04N 7/18* (2006.01)

(52) U.S. Cl.
CPC .............. *G08G 1/123* (2013.01); *H04N 7/183* (2013.01)

(58) Field of Classification Search
CPC ............................... H04N 7/183; G08G 1/123
USPC ......................................................... 340/991
See application file for complete search history.

(56) References Cited

U.S. PATENT DOCUMENTS

| | | | | |
|---|---|---|---|---|
| 9,892,637 | B2 * | 2/2018 | Demisse | G08G 1/017 |
| 9,970,615 | B1 * | 5/2018 | Cardillo | G08G 1/20 |
| 10,272,827 | B1 * | 4/2019 | Kemler | G05D 1/0223 |
| 10,394,345 | B2 * | 8/2019 | Donnelly | G09G 3/005 |
| 2003/0202005 | A1 * | 10/2003 | Sadahiro | H04N 5/775 |
| | | | | 715/716 |
| 2015/0348408 | A1 * | 12/2015 | Demisse | G08G 1/017 |
| | | | | 340/933 |
| 2016/0174024 | A1 * | 6/2016 | Gavin | H04W 4/44 |
| | | | | 455/456.3 |
| 2017/0178269 | A1 * | 6/2017 | McKinnon | G06Q 50/30 |
| 2017/0186054 | A1 * | 6/2017 | Fish | G06Q 50/30 |

(Continued)

FOREIGN PATENT DOCUMENTS

JP  2017-182137 A  10/2017
JP  2018-073351 A  5/2018

*Primary Examiner* — Zhen Y Wu
(74) *Attorney, Agent, or Firm* — Sughrue Mion, PLLC (57) ABSTRACT

A vehicle includes a communication unit configured to receive identification information for notification set for a user, an outside-vehicle notification unit configured to perform notification to the surrounding of the vehicle, and a controller configured to make the outside-vehicle notification unit perform notification of the identification information for notification to the surrounding of the vehicle. The vehicle further includes a positioning unit configured to measure a position of the vehicle. The communication unit is configured to further receive a predicted boarding position of the user to the vehicle. The controller is configured to, in a case where the measured position of the vehicle is included within a predetermined range from the predicted boarding position of the user, makes the outside-vehicle notification unit perform the notification of the identification information for notification to the surrounding of the vehicle.

8 Claims, 7 Drawing Sheets

(56) References Cited

U.S. PATENT DOCUMENTS

| | | | | |
|---|---|---|---|---|
| 2017/0294130 A1* | 10/2017 | Donnelly | ................ | H04W 4/40 |
| 2018/0129981 A1* | 5/2018 | Fujimoto | ............. | G05D 1/0223 |
| 2018/0188731 A1* | 7/2018 | Matthiesen | .......... | G05D 1/0088 |
| 2018/0292916 A1* | 10/2018 | Donnelly | ............... | G09G 3/005 |
| 2018/0373936 A1* | 12/2018 | Kim | ................... | G06K 9/00228 |
| 2019/0103028 A1* | 4/2019 | Kobayashi | ............ | G01C 21/362 |
| 2019/0366917 A1* | 12/2019 | Lee | ......................... | B60Q 1/50 |

\* cited by examiner

VEHICLE AND NOTIFICATION METHOD

INCORPORATION BY REFERENCE

The disclosure of Japanese Patent Application No. 2018-227182 filed on Dec. 4, 2018 including the specification, drawings and abstract is incorporated herein by reference in its entirety.

BACKGROUND

1. Technical Field

The present disclosure relates to a vehicle capable of notifying the surrounding of a vehicle of some kind of information, and a notification method using such a vehicle.

2. Description of Related Art

A technique in which a vehicle under autonomous driving control is used as a vehicle for a mobility service, such as a taxi service, a ride-sharing service, has been suggested (for example, see Japanese Unexamined Patent Application Publication No. 2017-182137 (JP 2017-182137 A)).

In the vehicle that is used in such a technique, since an occupant who performs guidance is not in the vehicle, it is desirable that a user can simply confirm whether or not the user can board the vehicle. Accordingly, a vehicle control system including an output unit that outputs information toward the outside of a vehicle, an in-vehicle situation acquisition unit that a situation inside the vehicle, and a controller that makes the output unit output whether or not a person is boardable the vehicle based on in-vehicle information acquired by the in-vehicle situation acquisition unit has been suggested (for example, see Japanese Unexamined Patent Application Publication No. 2018-73351 (JP 2018-73351 A)).

SUMMARY

At a location where many vehicles gather, such as a station or an airport, a user who requests vehicle allocation of a vehicle providing a mobility service hardly finds the vehicle allocated for the user. In particular, in a case where another vehicle having the appearance similar to the appearance of the allocated vehicle is present near a location where the user is waiting, there is a concern that the user hardly identifies the vehicle allocated for the user.

Accordingly, the present disclosure provides a vehicle capable of allowing a user who requests vehicle allocation to easily identify a vehicle allocated for the user.

A first aspect of the present disclosure relates to a vehicle that is boardable by a user. The vehicle includes a communication unit, an outside-vehicle notification unit, and a controller. The communication unit is configured to receive identification information for notification set for a user. The outside-vehicle notification unit is configured to perform notification to the surrounding of the vehicle. The controller is configured to make the outside-vehicle notification unit perform notification of identification information for notification to the surrounding of the vehicle.

The vehicle according to the first aspect of the present disclosure may further include a positioning unit configured to measure a position of the vehicle. The communication unit may be configured to further receive a predicted boarding position of a user to the vehicle. The controller may be configured to make the outside-vehicle notification unit perform notification of the identification information for notification to the surrounding of the vehicle in a case where the measured position of the vehicle is included within a predetermined range from the predicted boarding position.

In the vehicle according to the first aspect of the present disclosure, the controller may be configured to, in a case where detection is made that the user boards the vehicle while the outside-vehicle notification unit is made to perform the notification of the identification information for notification to the surrounding of the vehicle, end the notification of the identification information for notification in the outside-vehicle notification unit.

In the vehicle according to the first aspect of the present disclosure, the controller may be configured to, in a case where a signal according to a notification operation of the user is received through the communication unit, change a notification aspect of the identification information for notification in the outside-vehicle notification unit over a given period.

The vehicle according to the first aspect of the present disclosure may further include an imaging unit configured to image the surrounding of the vehicle to generate an image representing the surrounding. The controller may be configured to transmit the image to a terminal carried with the user through the communication unit.

A second aspect of the present disclosure relates to a notification method in a vehicle that is boardable by a user. The notification method includes receiving identification information for notification set for the user through a communication unit in the vehicle, and making an outside-vehicle notification unit provided in the vehicle and configured to perform notification to a surrounding of the vehicle perform notification of the identification information for notification to the surrounding of the vehicle.

With the vehicle according to the aspects of the present disclosure, it is possible to allow a user who requests vehicle allocation to easily identify a vehicle allocated for the user.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, a vehicle allocation management system including a vehicle that provides a mobility service and is boardable by a user will be described referring to the drawings. The vehicle has an outside-vehicle display device that displays information to the surrounding of the vehicle, and in a case where the vehicle enters within a predetermined range from a predicted boarding position of a user who requests vehicle allocation, makes the outside-vehicle display device display identification information for notification set for the user. With this, the vehicle enables the user who requests vehicle allocation to easily identify a vehicle allocated for the user.

Figure 1:
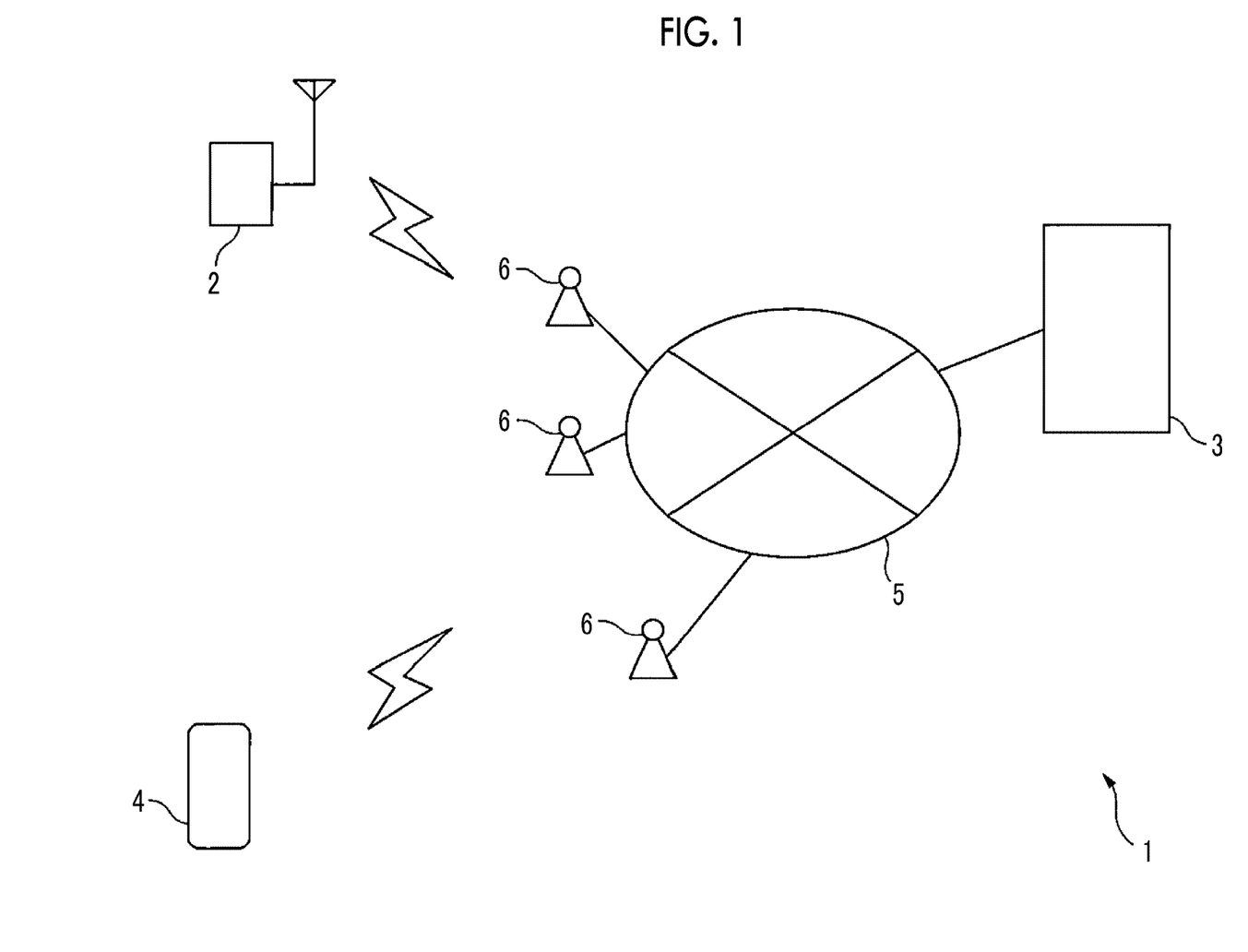
FIG. 1 is a schematic configuration diagram of a vehicle allocation management system in which a vehicle according to an embodiment is mounted.

FIG. 1 is a schematic configuration diagram of a vehicle allocation management system in which a vehicle according to an embodiment is mounted. A vehicle allocation management system 1 is an example of a notification system, and has a terminal 2, a server 3, and a vehicle 4. In FIG. 1, although one terminal 2 is shown, the number of terminals 2 included in the vehicle allocation management system 1 is not limited to one, and a plurality of terminals 2 may be included in the vehicle allocation management system 1. Similarly, in FIG. 1, although one vehicle 4 is shown, the number of vehicles 4 included in the vehicle allocation management system 1 is not limited to one, and a plurality of vehicles 4 may be included in the vehicle allocation management system 1.

The terminal 2 is, for example, a portable terminal having a wireless communication function, such as a mobile phone or a tablet computer. For example, the terminal 2 accesses a wireless base station 6 that is connected to a communication network 5 through a gateway (not shown), whereby the terminal 2 is connected to the communication network 5 through the wireless base station 6. The terminal 2 transmits a vehicle allocation request for requesting vehicle allocation of the vehicle 4 to the server 3 through the wireless base station 6 and the communication network 5 according to an operation of the user. The terminal 2 transmits a highlighting request for requesting the vehicle 4 to be allocated to highlight the identification information for notification displayed on the outside-vehicle display device to the server 3 through the wireless base station 6 and the communication network 5 according to an operation of the user. In the vehicle allocation request, for example, identification information and identification information for notification of the user, a predicted boarding position and a predicted unboarding position (that is, a destination) of the user, and the like are included. The identification information for notification is set for the user, and is information for allowing the user to identify a vehicle allocated for the user, which is known for the user and is displayed to the surrounding of the vehicle by the outside-vehicle display device of the vehicle 4. Details of the identification information for notification will be described below. In the highlighting request, for example, the identification information of the user and a flag representing the highlighting request are included.

For example, the server 3 is connected to the communication network 5 through the gateway (not shown). In a case where the vehicle allocation request is received from the terminal 2, the server 3 creates a vehicle allocation instruction including information, such as the identification information, the identification information for notification, the predicted boarding position, and the predicted unboarding position of the user who is allowed to board the vehicle, and transmits the vehicle allocation instruction to the vehicle 4 through the communication network 5 and the wireless base station 6. The server 3 may search for a traveling route of the vehicle 4 based on a current position of the vehicle 4, the predicted boarding position, and the predicted unboarding position according to a predetermined route search method, such as a Dijkstra's algorithm, and may include the obtained traveling route in the vehicle allocation instruction. In a case where a plurality of vehicles 4 is included in the vehicle allocation management system 1, the server 3 may select a vehicle, to which the vehicle allocation instruction is transmitted, from among the vehicles 4 based on the predicted boarding position or the like included in the received vehicle allocation request. At this time, the server 3 may select a vehicle, the current position of which is closest to the predicted boarding position included in the vehicle allocation request, from among a plurality of vehicles 4 not carrying other users. Alternatively, the server 3 may select a vehicle, the current position of which is closest to the predicted boarding position included in the vehicle allocation request among one or more vehicles 4, in which other users are not carried, or one or more vehicles 4, of which the distance from a traveling route toward a predicted unboarding position of another user on board to the predicted boarding position and the predicted unboarding position included in the vehicle allocation request is equal to or less than a predetermined distance. The server 3 stores the identification information of the user included in the vehicle allocation request in association with identification information of the vehicle 4, to which the vehicle allocation instruction is transmitted for the user, thereby specifying a vehicle allocated to the user.

In a case where the highlighting request is received from the terminal 2, the server 3 specifies a vehicle 4 allocated for the user with reference to the identification information of the user included in the highlighting request. The server 3 creates a highlighting instruction to highlight the display of the identification information for notification on the outside-vehicle display device of the vehicle 4 to the specified vehicle 4 and transmits the highlighting instruction to the specified vehicle 4 through the communication network 5 and the wireless base station 6.

The vehicle 4 is an autonomous driving vehicle under autonomous driving control, and is connected to be communicable with the server 3 through the communication network 5 and the wireless base station 6. In a case where the vehicle allocation instruction is received from the server 3 through the communication network 5 and the wireless base station 6, the vehicle 4 moves to the predicted boarding position of the user according to the vehicle allocation instruction. At this time, in a case of entering within a predetermined range from the predicted boarding position of the user, the vehicle 4 displays the identification information for notification of the user on the outside-vehicle display device of the vehicle 4, and allows the user to easily identify that the vehicle 4 is a vehicle allocated for the user. In a case where the highlighting instruction is received from the server 3, the vehicle 4 changes a display aspect (that is, a notification aspect) of the identification information for notification on the outside-vehicle display device over a given period. In a case where the user boards the vehicle, the vehicle 4 searches for a traveling route to the predicted unboarding position of the user indicated in the vehicle allocation instruction and moves to the predicted unboarding position along the traveling route.

Figure 2:
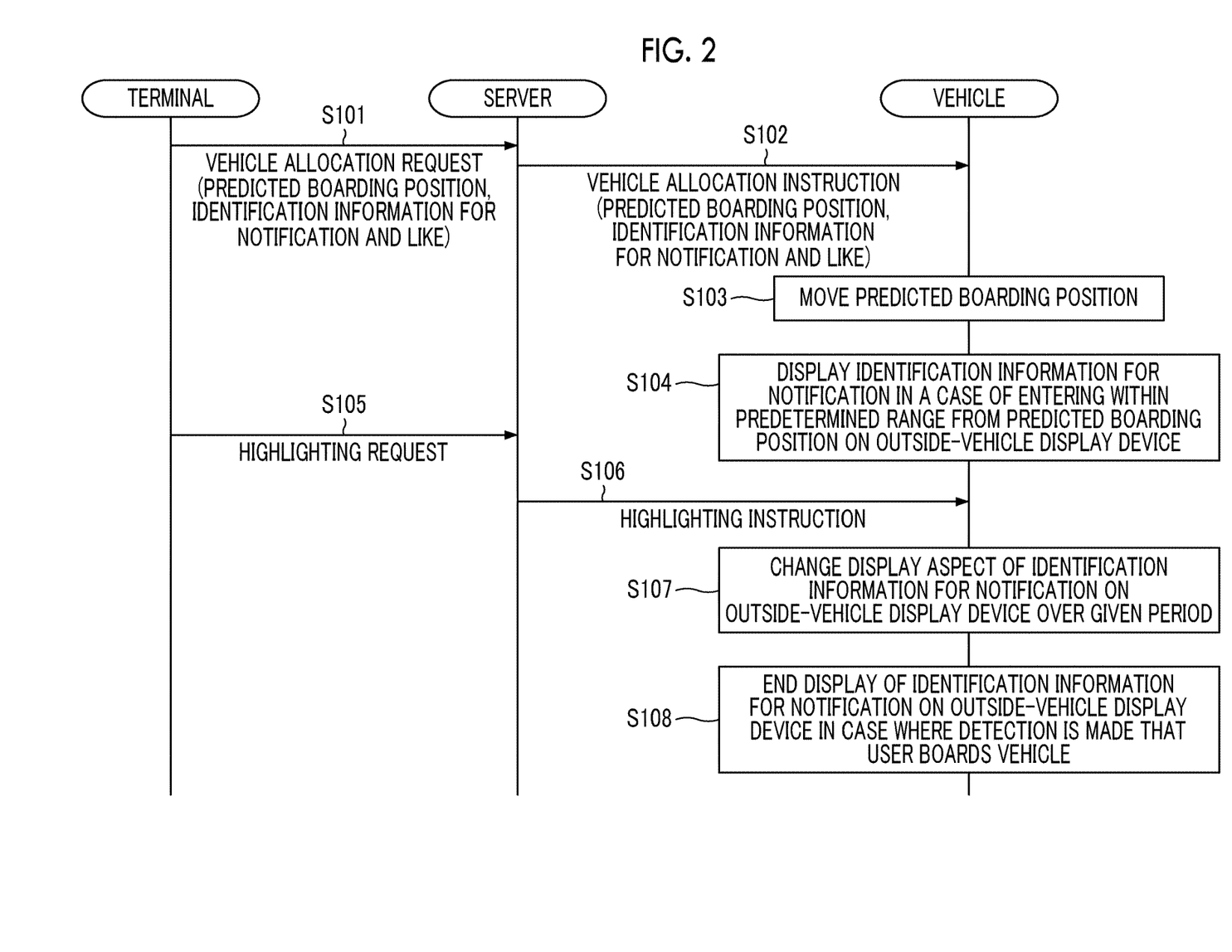
FIG. 2 is a sequence diagram relating to notification processing.

FIG. 2 is a sequence diagram related to notification processing. In the sequence diagram shown in FIG. 2, communication between the terminal 2 and the vehicle 4, and the server 3 is performed through the communication network 5 and the wireless base station 6 as described above.

The user of the terminal 2 operates the terminal 2 to start an application related to a mobility service and performs an operation to input the identification information for notification, the predicted boarding position, the predicted unboarding position, and the like and to request vehicle allocation through the application. The predicted boarding position may be a current position of the terminal 2 that is measured by a positioning device in the terminal 2. Then, the terminal 2 generates a vehicle allocation request according to an operation of the user and transmits the vehicle allocation request to the server 3 (Step S101). In the vehicle allocation request, the predicted boarding position and the predicted unboarding position are represented by, for example, a facility name, an address, or a combination of a latitude and a longitude.

In a case where the vehicle allocation request is received, the server 3 selects the vehicle 4 to be allocated with reference to the predicted boarding position and the like included in the vehicle allocation request. Then, the server 3 creates a vehicle allocation instruction including information, such as the identification information, the identification information for notification, the predicted boarding position, and the predicted unboarding position of the user who boards the vehicle, and transmits the vehicle allocation instruction to the selected vehicle 4 (Step S102). The server 3 stores the identification information of the selected vehicle 4 in association with the identification information of the user included in the vehicle allocation request, thereby specifying a vehicle allocated to the user.

The vehicle 4 that receives the vehicle allocation instruction obtains a traveling route from the current position of the vehicle 4 to the predicted boarding position included in the vehicle allocation instruction and moves to the predicted boarding position along the obtained traveling route (Step S103). Then, in a case of entering within the predetermined range from the predicted boarding position, the vehicle 4 makes the outside-vehicle display device display the identification information for notification (Step S104).

The terminal 2 operates the terminal 2 and performs an operation to transmit the highlighting request through the application related to the mobility service in order to easily find the vehicle allocated for the user. The operation is an example of a notification operation. Then, the terminal 2 generates a highlighting request including the identification information according to the operation of the user and transmits the highlighting request to the server 3 (Step S105). In a case where the highlighting request is received, the server 3 specifies the vehicle allocated to the user from the identification information of the vehicle stored in association with the identification information of the user included in the highlighting request. Then, the server 3 creates a highlighting instruction and transmits the highlighting instruction to the specified vehicle 4 (Step S106).

The vehicle 4 that receives the highlighting instruction changes a display aspect of the identification information for notification on the outside-vehicle display device over a given period (for example, for 30 seconds to three minutes), thereby highlighting the identification information for notification (Step S107). Thereafter, in a case where detection is made that the user boards the vehicle, the vehicle 4 ends the display of the identification information for notification on the outside-vehicle display device (Step S108). In a case where the user does not perform an operation to transmit the highlighting request to the terminal 2, the processing of Steps S105 to S107 is omitted. In a case where the user repeats the operation to transmit the highlighting request to the terminal 2, the processing of Steps S105 to S107 may be executed by the number of repetitions.

Figure 3:
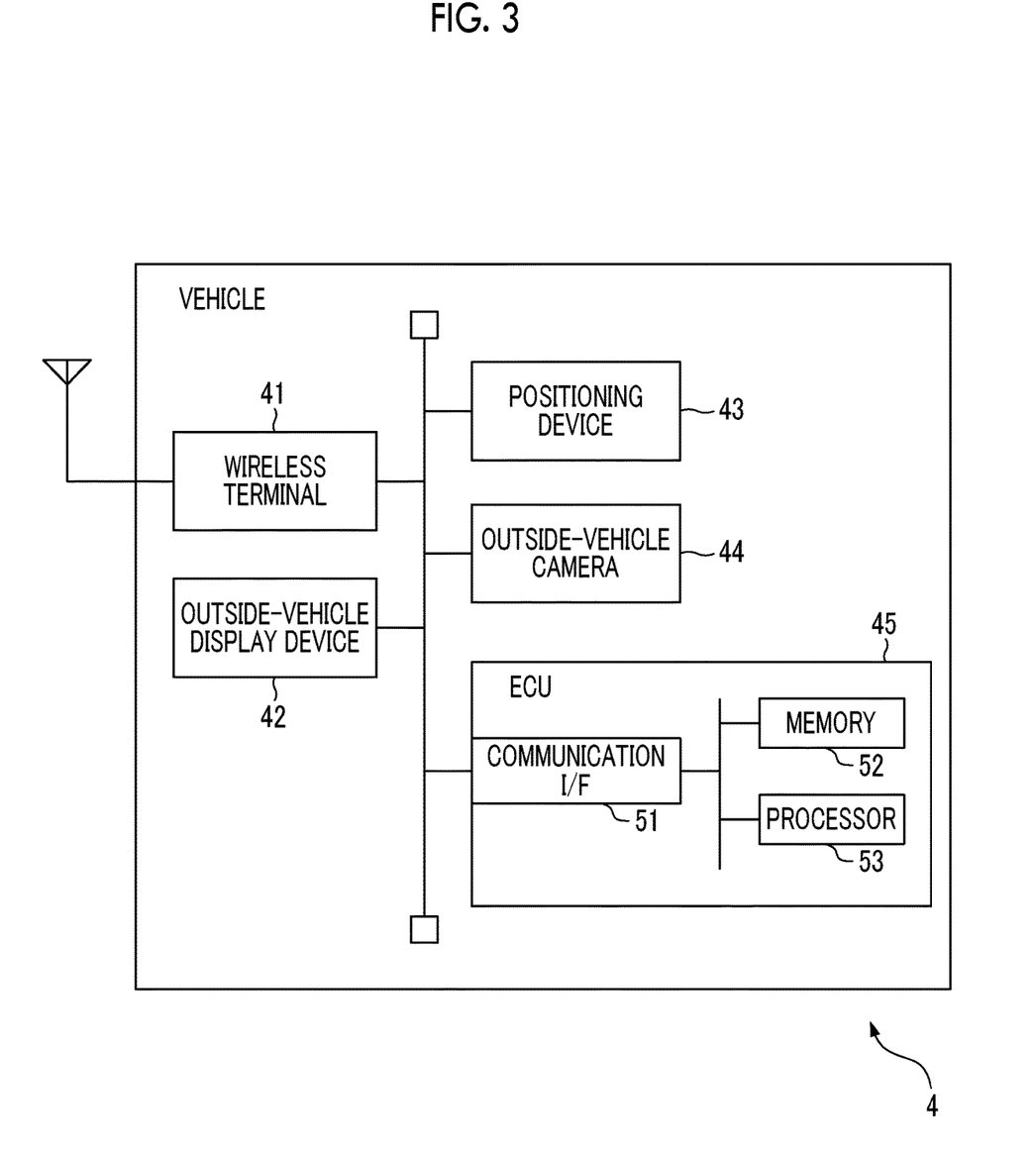
FIG. 3 is a schematic configuration diagram of a control system related to the notification processing of the vehicle.

FIG. 3 is a schematic configuration diagram of a control system related to the notification processing of vehicle 4.

The vehicle 4 has a wireless terminal 41, at least one outside-vehicle display device 42, a positioning device 43, an outside-vehicle camera 44, and an electronic control unit (ECU) 45. The wireless terminal 41, the outside-vehicle display device 42, the positioning device 43, and the outside-vehicle camera 44 are connected to be communicable with the ECU 45 through an in-vehicle network conforming to a standard, such as a controller area network (CAN), provided in the vehicle 4. The vehicle 4 may further have an outside-vehicle sensor (not shown), such as a radar or a LIDER sensor, which obtains information in the surrounding of the vehicle 4, a storage device (not shown) that stores map information, and a navigation system (not shown) that obtains a traveling route from a current place of the vehicle 4 to a movement destination according to a predetermined route search method, such as a Dijkstra's algorithm.

The wireless terminal 41 is an example of a communication unit, and has, for example, an antenna, and a signal processing circuit that executes various kinds of processing related to wireless communication, such as modulation and demodulation of a wireless signal. The wireless terminal 41 receives a downlink wireless signal from the wireless base station 6 and transmits an uplink wireless signal to the wireless base station 6. That is, the wireless terminal 41 extracts a signal (for example, the vehicle allocation instruction, the highlighting instruction, or the like) to be transmitted from the server 3 to the vehicle 4 from the downlink wireless signal received from the wireless base station 6 and delivers the extracted signal to the ECU 45. The wireless terminal 41 generates the uplink wireless signal including a signal (for example, the current position, the traveling route, or the like of the vehicle 4) to be transmitted from the ECU 45 to the server 3 and transmits the wireless signal.

At least one outside-vehicle display device 42 is an example of an outside-vehicle notification unit, and is configured to display various kinds of information to the surrounding of the vehicle 4, thereby performing notification to the surrounding of the vehicle 4. To this end, each outside-vehicle display device 42 has, for example, a liquid crystal display, an organic EL display, or an electric bulletin board having a plurality of light sources, such as LEDs, arranged in an array.

Figure 4A:
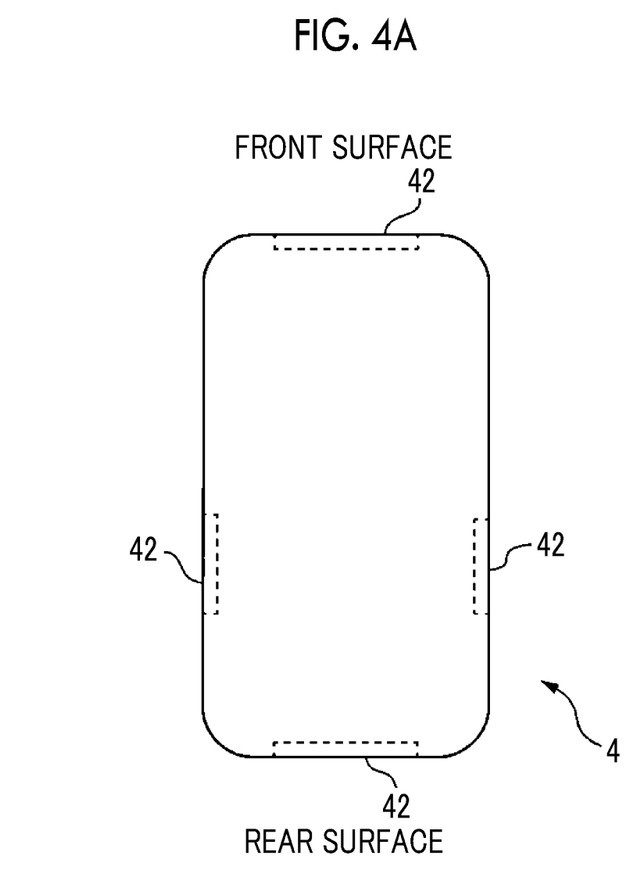
FIG. 4A is a top view of the vehicle showing an example of an arrangement of an outside-vehicle display device.
Figure 4B:
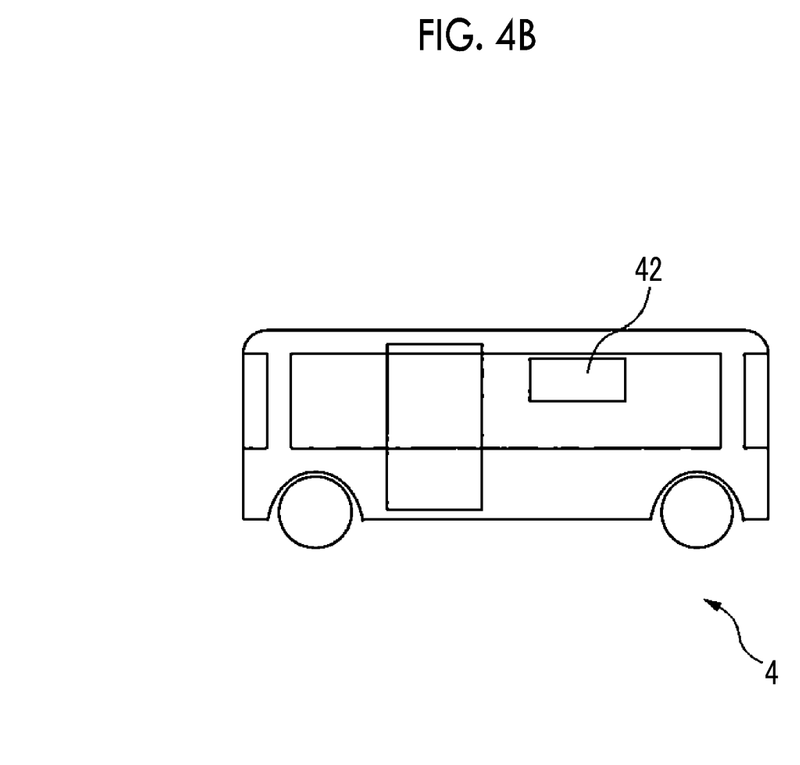
FIG. 4B is a side view of the vehicle showing an example of an arrangement of the outside-vehicle display device.

FIG. 4A is a top view of the vehicle 4 showing an example of an arrangement of the outside-vehicle display device 42, and FIG. 4B is a side view of the vehicle 4 showing an example of an arrangement of the outside-vehicle display device 42. As shown in FIGS. 4A and 4B, the vehicle 4 has, for example, four outside-vehicle display devices 42, and the outside-vehicle display devices 42 are attached to the vehicle 4 on a front surface, a rear surface, and both side surfaces of the vehicle 4, respectively, such that a display surface turns toward the outside of the vehicle 4 and the display surface is observable from the outside of the vehicle 4. The arrangement of the outside-vehicle display device 42 is not limited to the example, and for example, three outside-vehicle display devices 42 may be attached to the front surface, the rear surface, and one of the right and left side surfaces of the vehicle 4. Alternatively, one or two outside-vehicle display devices 42 may be attached on the ceiling of the vehicle 4 such that the display surface turns forward or sideward of the vehicle 4.

Each outside-vehicle display device 42 displays, for example, the identification information for notification received from the ECU 45 such that the user can view the identification information for notification. In a case where the vehicle 4 receives the highlighting instruction, each outside-vehicle display device 42 changes the display aspect of the identification information for notification over the given period according to display control of the ECU 45.

Referring to FIG. 3 again, the positioning device 43 is an example of a positioning unit, and measures the position of the host vehicle in every predetermined cycle. To this end, the positioning device 43 may have, for example, a receiver that receives global positioning system (GPS) signals, and an arithmetic circuit that calculates the position of the vehicle from the GPS signals. The positioning device 43 may be incorporated into the navigation system. Each time the position of the host vehicle is measured, the positioning device 43 outputs a measurement value to the ECU 45.

The outside-vehicle camera 44 is an example of an imaging unit, and has a two-dimensional detector constituted of an array of photoelectric conversion elements having sensitivity to visible light, such as a CCD or a C-MOS, and an imaging optical system that forms an image of a region to be an imaging target on the two-dimensional detector. The outside-vehicle camera 44 is attached inside a vehicle cabin of the vehicle 4, for example, so as to turn forward or sideward of the vehicle 4. The outside-vehicle camera 44 images a region in the surrounding of the vehicle 4 in every predetermined imaging cycle (for example, 1/30 seconds to 1/10 seconds) and generates an image reflecting the region. The image obtained by the outside-vehicle camera 44 may be a color image or a gray image.

Each time the image is generated, the outside-vehicle camera 44 outputs the generated image to the ECU 45.

The ECU 45 is an example of a controller, and is configured to perform autonomous driving control of the vehicle 4 and control the units of the vehicle 4. To this end, the ECU 45 has, for example, a communication interface 51 for communication with the units of the vehicle 4, a memory 52, and a processor 53.

The communication interface 51 has an interface circuit for connection of the ECU 45 to the in-vehicle network. That is, the communication interface 51 is connected to the wireless terminal 41, the outside-vehicle display device 42, the positioning device 43, and the outside-vehicle camera 44 through the in-vehicle network. The communication interface 51 delivers the signal received from the server 3, such as the vehicle allocation instruction or the highlighting instruction, from the wireless terminal 41 to the processor 53. Similarly, the communication interface 51 delivers the measurement value of the current position of the vehicle 4 received from the positioning device 43 and the image received from the outside-vehicle camera 44 to the processor 53.

The memory 52 is an example of a storage unit, and has, for example, a volatile semiconductor memory and a non-volatile semiconductor memory. The memory 52 stores data for use in various kinds of processing to be executed by the processor 53 of the ECU 45, for example, the current position of the vehicle 4, the image received from the outside-vehicle camera 44, the predicted boarding position, the predicted unboarding position, and the identification information for notification included in the vehicle allocation instruction, and the like. In addition, the memory 52 may store map information or the like.

The processor 53 has one or a plurality of central processing units (CPUs) and peripheral circuits. The processor 53 may further have other arithmetic circuits, such as a logical arithmetic unit, a numerical arithmetic unit, and a graphic processing unit. In a case where the vehicle 4 receives the vehicle allocation instruction, the processor 53 notifies the navigation system of the current position of the vehicle 4 and the predicted boarding position included in the vehicle allocation instruction, and makes the navigation system search for a traveling route from the current position of the vehicle 4 to the predicted boarding position. Then, the processor 53 performs the autonomous driving control of the vehicle 4 such that the vehicle 4 travels along the traveling route. In a case where the user boards the vehicle 4, the position of the vehicle 4 at the time of boarding of the user measured by the positioning device 43 and the predicted unboarding position included in the vehicle allocation instruction are notified to the navigation system, and the navigation system is made to search for a traveling route from the position of the vehicle 4 at the time of boarding of the user to the predicted unboarding position. Then, the processor 53 performs the autonomous driving control of the vehicle 4 such that the vehicle 4 travels along the traveling route. In addition, the processor 53 executes the notification processing. The processor 53 may transmit the traveling route obtained by the navigation system along with the identification information of the vehicle 4 to the server 3 through the wireless terminal 41. The processor 53 may transmit the measurement value of the current position of the vehicle 4 obtained by the positioning device 43 along with the identification information of the vehicle 4 to the server 3 through the wireless terminal 41 in every predetermined cycle (for example, 30 seconds, one minute, or five minutes).

Figure 5:
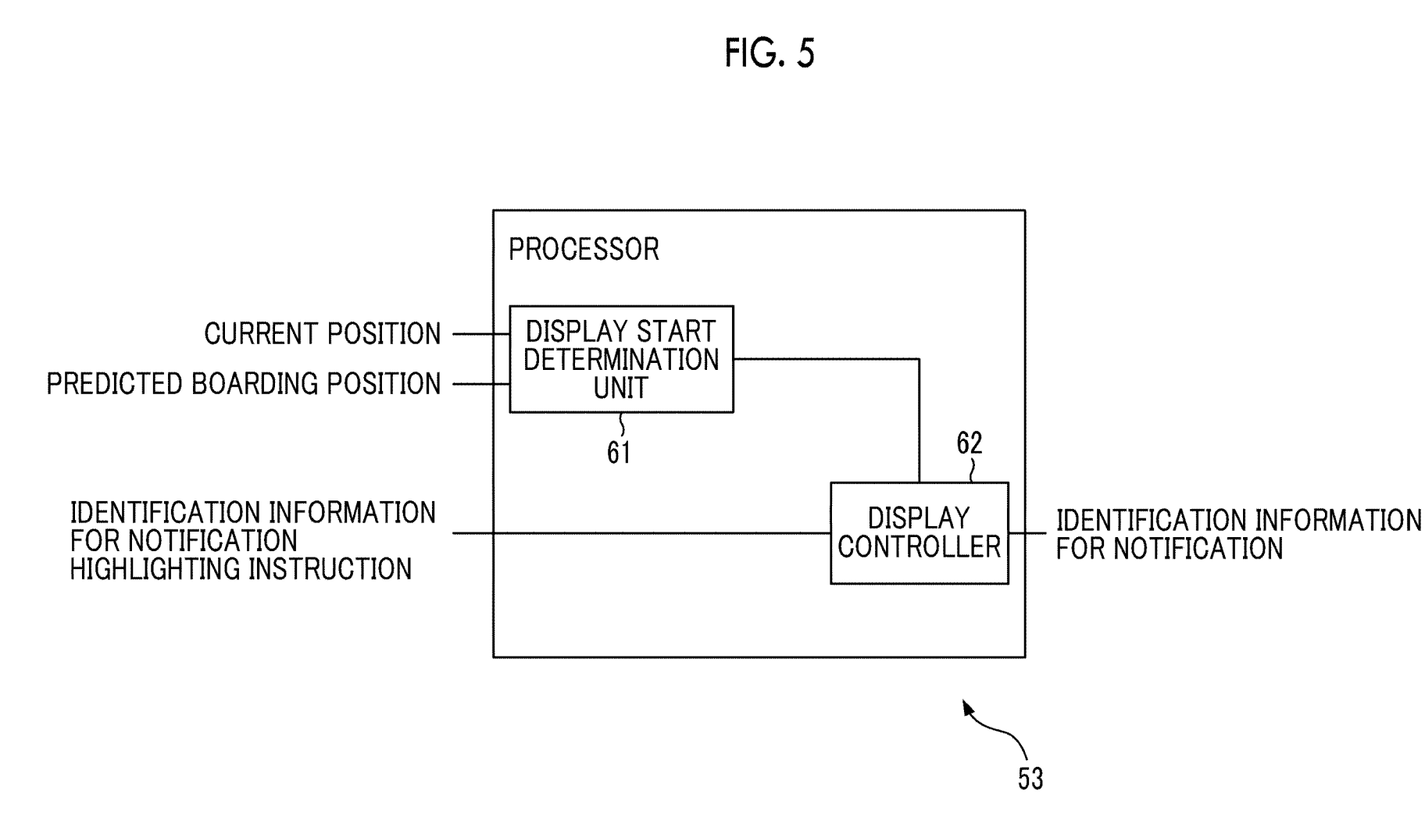
FIG. 5 is a functional block diagram of a processor related to the notification processing.

FIG. 5 is a functional block diagram of the processor 53 related to the notification processing. The processor 53 has a display start determination unit 61 and a display controller 62. The units of the processor 53 are functional modules that are implemented by a computer program operating on the processor 53. Alternatively, the units of the processor 53 may be dedicated arithmetic circuits that are provided in the processor 53.

Each time the measurement value of the current position of the vehicle 4 is received from the positioning device 43, the display start determination unit 61 determines whether or not the measurement value is included within a predetermined range from the predicted boarding position indicated by the vehicle allocation instruction. The predetermined range is set to a range in which the user can view the vehicle 4, for example, a range of a radius of 50 m to 100 m from the predicted boarding position. In a case where the measurement value of the current position of the vehicle 4 is included within the predetermined range, the display start determination unit 61 determines to start the display on the outside-vehicle display device 42. Then, the display start determination unit 61 notifies the display controller 62 of the start of the display on the outside-vehicle display device 42. In a case where the display of the identification information for notification on the outside-vehicle display device 42 is started once, even though the vehicle 4 is out of the predetermined range from the predicted boarding position later, the display of the identification information for notification on the outside-vehicle display device 42 may be continued until boarding of the user is detected.

In a case where the predicted boarding position of the user is inside a building having a plurality of stories, such as a multistory parking space, information representing the predicted boarding position included in the vehicle allocation request transmitted from the terminal 2 to the server 3 and the vehicle allocation instruction transmitted from the server 3 to the vehicle 4 may include information representing the story of the building to be the predicted boarding position. In this case, the display start determination unit 61 may determine that the vehicle 4 is included within the predetermined range when the vehicle 4 reaches the story of the building represented by the predicted boarding position. In this case, the display start determination unit 61 may recognize display representing a story provided in each story of the building, which is represented in an image obtained by the outside-vehicle camera 44, thereby recognizing the story where the vehicle 4 is positioned. In this case, the display start determination unit 61 may perform template matching with a template of the display representing the story and the image or may input the image to a discriminator learned in advance to recognize the display representing the story, thereby recognizing the story where the vehicle 4 is positioned. Such a discriminator can be, for example, a discriminator based on a machine learning system for use in image recognition, such as a neural network or adaBoost. Alternatively, the display start determination unit 61 may estimate an altitude of the vehicle 4 with the GPS signals received by the positioning device 43 and may recognize the story where the vehicle 4 is positioned based on the estimated altitude.

In a case where the start of the display on the outside-vehicle display device 42 is notified from the display start determination unit 61, the display controller 62 makes the outside-vehicle display device 42 display the identification information for notification included in the vehicle allocation instruction. As described above, the identification information for notification is set for the user, and is information for allowing the user to identify the vehicle allocated for the user, which is known for the user. The identification information for notification is set, for example, by the user operating the terminal 2 carried with the user. The identification information for notification can be, for example, a nickname of the user or the initials of a name of the user. In this way, since the identification information for notification can be information different from information with which another person can specify the user, such as the name of the user, even though the identification information for notification is displayed on the outside-vehicle display device 42, leakage of personal information of the user who requests vehicle allocation is suppressed. The identification information for notification is not limited thereto, and information that can be identified to be information set by the user may be used. The identification information for notification may be any one of text information, a graphic, and an image.

In the vehicle allocation request and the vehicle allocation instruction, two or more kinds of identification information for notification may be included. In this case, the display controller 62 may perform control such that the respective kinds of identification information for notification are alternately displayed on the outside-vehicle display device 42. In a case where the vehicle 4 has a plurality of outside-vehicle display devices 42, the display controller 62 may make the outside-vehicle display devices display different kinds of identification information for notification.

Figure 6:
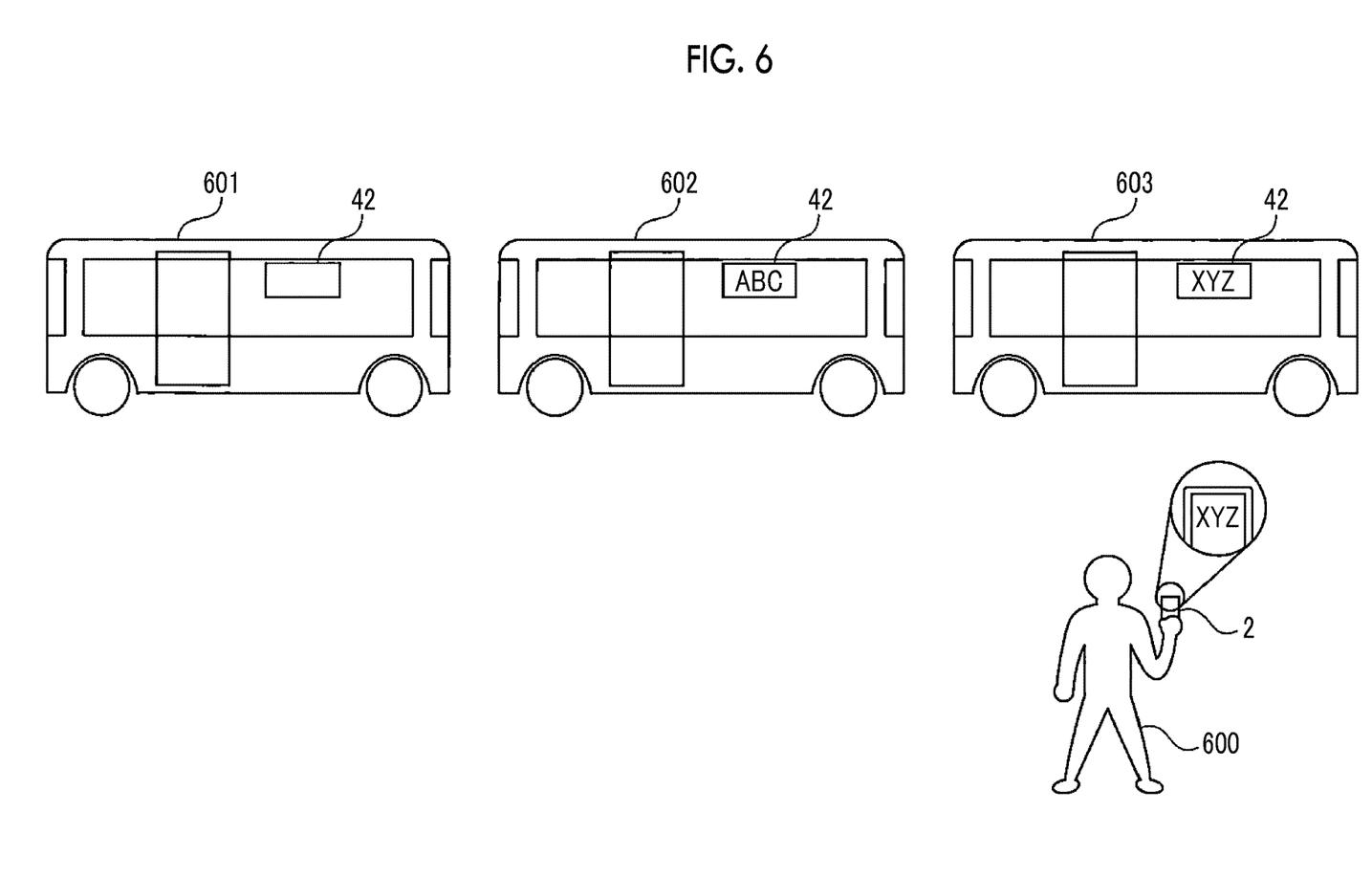
FIG. 6 is a diagram showing a state in which a user is waiting for an allocated vehicle.

FIG. 6 is a diagram showing a state in which a user is waiting for an allocated vehicle. In an example shown in FIG. 6, it is assumed that a user 600 includes a character string "XYZ" as the identification information for notification in the vehicle allocation request to be transmitted from the terminal 2. A plurality of vehicles 601 to 603 passes near the user 600. Among these, on the outside-vehicle display device 42 of the vehicle 601, the identification information for notification is not displayed. A character string "ABC" is displayed on the outside-vehicle display device 42 of the vehicle 602, and a character string "XYZ" is displayed on the outside-vehicle display device 42 of the vehicle 603. Accordingly, the user 600 can easily determine that the vehicle 603, in which the same information as the identification information for notification included in the vehicle allocation request by the user is displayed, is a vehicle allocated for the user.

After the display of the identification information for notification on the outside-vehicle display device 42 is started, in a case where detection is made that the user boards the vehicle 4, the display controller 62 may end the display of the identification information for notification on the outside-vehicle display device 42. For example, in a case where the seating sensor (not shown) provided in the seat of the vehicle 4 detects that the user sits on the seat, the display controller 62 determines that the user boards the vehicle 4. The seating sensor is, for example, a pressure sensor provided in a seating surface of the seat or an optical sensor in which a light source, such as an infrared LED, and a detector receiving light emitted from the light source are arranged to face each other across the user who sits on the seat. Alternatively, in a case where an opening and closing sensor (not shown) detects that any door of the vehicle 4 is opened, the display controller 62 may determine that the user boards the vehicle. Alternatively, in a case where a predetermined time (for example, three to five minutes) has elapsed after the vehicle 4 reaches the predicted boarding position included in the vehicle allocation instruction, the display controller 62 may end the display of the identification information for notification on the outside-vehicle display device 42.

In addition, in a case where the vehicle 4 receives the highlighting instruction, the display controller 62 changes a display aspect (hereinafter, for convenience of description, referred to as a special display aspect) of the identification information for notification on the outside-vehicle display device 42 over a given period so as to be different from a display aspect when the highlighting instruction is not received. For example, while the special display aspect is being applied, the display controller 62 changes a display color (for example, red or blue) of the identification information for notification so as to be different from a display color (for example, yellow or white) of the identification information for notification in a normal display aspect. Alternatively, the display controller 62 may make the outside-vehicle display device 42 constantly display the identification information for notification while the normal display aspect is being applied, and may make the outside-vehicle display device 42 blink the identification information for notification while the special display aspect is being applied. Alternatively, the display controller 62 may make the outside-vehicle display device 42 display the identification information for notification in a stationary state while the normal display aspect is being applied, and may make the outside-vehicle display device 42 display such that the identification information for notification moves according to a predetermined operation aspect (for example, slide, fade, or the like) while the special display aspect is being applied.

In this way, the display aspect of the identification information for notification displayed on the outside-vehicle display device 42 of the vehicle 4 allocated to the user is switched so as to be highlighted over the given period with an operation of the user to make the terminal 2 transmit the highlighting request as a trigger. For this reason, the user may look for the vehicle 4, in which the display aspect of the identification information for notification displayed on the outside-vehicle display device 42 is switched, as the vehicle allocated for the user. Accordingly, the display controller 62 can allow the user to easily find the vehicle allocated for the user.

Figure 7:
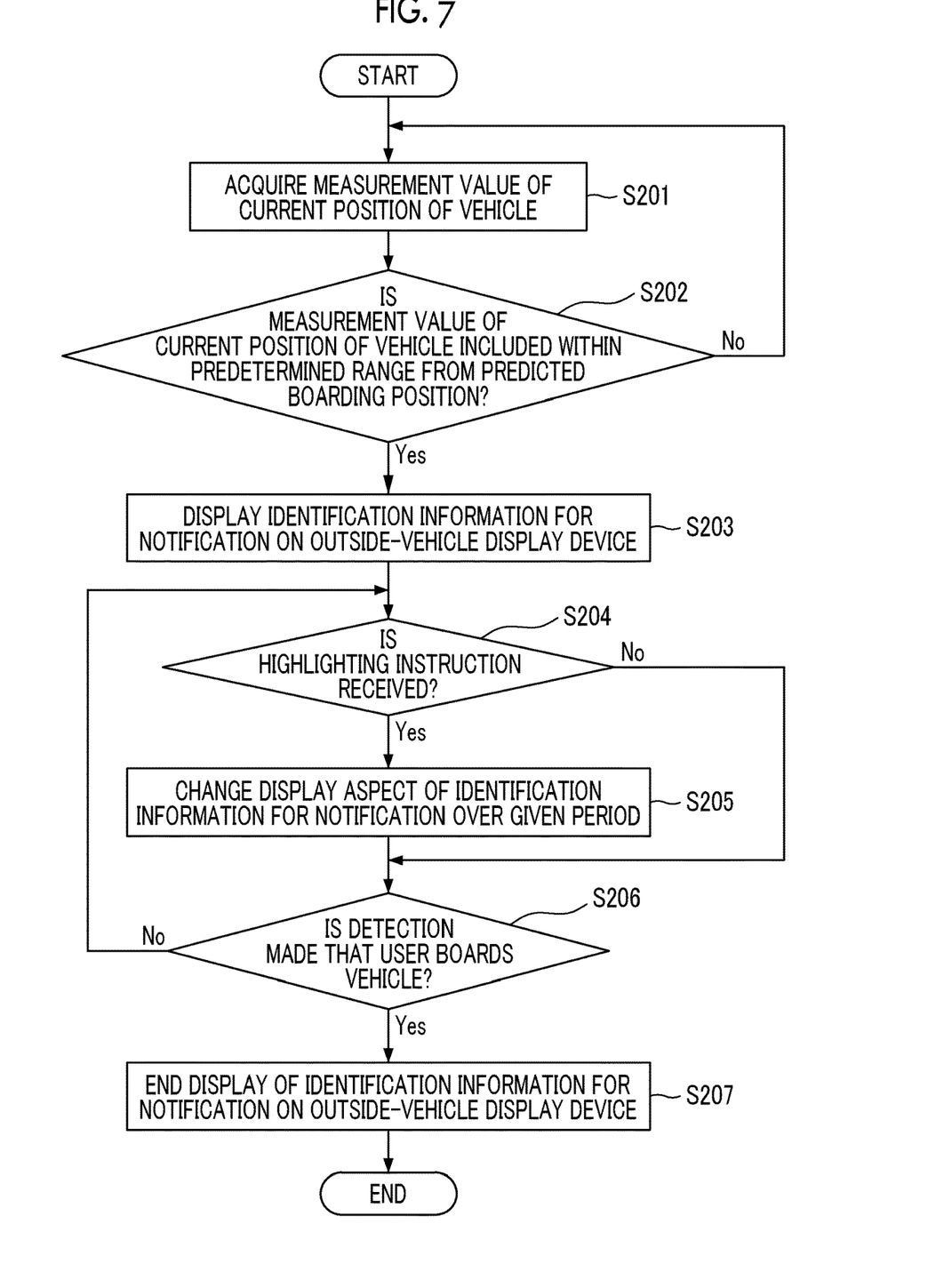
FIG. 7 is an operation flowchart of the notification processing.

FIG. 7 is an operation flowchart of the notification processing that is executed by the processor 53. In a case where the vehicle 4 receives the vehicle allocation instruction from the server 3, the processor 53 executes the notification processing according to the following operation flowchart.

The display start determination unit 61 of the processor 53 acquires the measurement value of the current position of the vehicle 4 from the positioning device 43 through the communication interface 51 (Step S201). Then, the display start determination unit 61 determines whether or not the measurement value of the current position of the vehicle 4 is included within the predetermined range from the predicted boarding position included in the vehicle allocation instruction (Step S202).

In a case where the measurement value of the current position of the vehicle 4 is not included within the predetermined range from the predicted boarding position included in the vehicle allocation instruction (Step S202—No), the processor 53 repeats the processing after Step S201 when a predetermined time (for example, five seconds to one minute) has elapsed.

In a case where the measurement value of the current position of the vehicle 4 is included within the predetermined range from the predicted boarding position included in the vehicle allocation instruction (Step S202—Yes), the display start determination unit 61 determines to start the display of the identification information for notification on the outside-vehicle display device 42. Then, the display controller 62 of the processor 53 makes the outside-vehicle display device 42 display the identification information for notification included in the vehicle allocation instruction (Step S203).

After the outside-vehicle display device 42 starts the display of the identification information for notification, the display controller 62 determines whether or not the vehicle 4 receives the highlighting instruction through the wireless terminal 41 (Step S204). In a case where the vehicle 4 receives the highlighting instruction (Step S204—Yes), the display controller 62 changes the display aspect of the identification information for notification on the outside-vehicle display device 42 over the given period (Step S205).

After Step S205 or in a case where the vehicle 4 does not receive the highlighting instruction in Step S204 (Step S204—No), the display controller 62 determines whether or not detection is made that the user boards the vehicle 4 (Step S206). In a case where detection is not made that the user boards the vehicle 4 (Step S206—No), the processor 53 repeats the processing after S204 when a predetermined time has elapsed.

In a case where detection is made that the user boards the vehicle 4 (Step S206—Yes), the display controller 62 ends the display of the identification information for notification on the outside-vehicle display device 42 (Step S207). Thereafter, the processor 53 ends the notification processing. In a case where the measurement value of the current position of the vehicle 4 is not included within the predetermined range from the predicted boarding position, even though the vehicle 4 receives the highlighting instruction, the display controller 62 may neglect the highlighting instruction. While the display aspect of the identification information for notification is changed by the display controller 62, even though detection is made that the user boards the vehicle 4, the display controller 62 may end the display of the identification information for notification on the outside-vehicle display device 42.

As described above, in a case where the vehicle enters within the predetermined range from the predicted boarding position, included in the vehicle allocation instruction, of the user who requests vehicle allocation, the vehicle makes the outside-vehicle display device display the identification information for notification included in the vehicle allocation instruction. For this reason, the user confirms the identification information for notification displayed on the outside-vehicle display device, thereby easily finding the vehicle allocated for the user. Accordingly, the vehicle can enable the user who requests vehicle allocation to easily identify the vehicle allocated for the user.

According to a modification example, the server 3 may transmit the identification information for notification separately from the vehicle allocation instruction to the vehicle allocated to the user who requests vehicle allocation, through the communication network 5 and the wireless base station 6.

According to another modification example, in a case where the vehicle 4 receives the highlighting instruction, the ECU 45 may make the wireless terminal 41 transmit the latest image of the surrounding of the vehicle 4 obtained by the outside-vehicle camera 44 along with the identification information of the vehicle 4 to the server 3 through the wireless base station 6 and the communication network 5. The server 3 may transfer the received image of the surrounding of the vehicle 4 to the terminal 2 of the user specified with reference to the correspondence relationship between the received identification information of the vehicle 4 and the identification information of the user who requests vehicle allocation. The terminal 2 may display the received image of the vehicle 4. With this, since the user can confirm a surrounding situation viewed from the vehicle allocated for the user, the user more easily finds the vehicle allocated for the user.

The ECU 45 may make the wireless terminal 41 transmit information representing the appearance of the vehicle 4, for example, an image representing outside-vehicle display information in the latest display aspect or an image representing the appearance of the vehicle 4 including such an image along with the latest image of the surrounding of the vehicle 4 to the server 3 through the wireless base station 6 and the communication network 5. Information representing the appearance of the vehicle 4 is stored in, for example, the memory 52 in advance. The server 3 may transfer information representing the appearance of the vehicle 4 along with the received image of the surrounding of the vehicle 4 to the terminal 2 of the user who requests vehicle allocation and the terminal 2 may display information representing the appearance of the vehicle 4. With this, since the user can confirm the appearance of the vehicle allocated for the user with the terminal 2, the user more easily finds the vehicle allocated for the user.

Alternatively, in a case where the measurement value of the current position of the vehicle 4 is included within the predetermined range from the predicted boarding position included in the vehicle allocation instruction, the ECU 45 may make the wireless terminal 41 transmit the latest image of the surrounding of the vehicle 4 obtained by the outside-vehicle camera 44 along with the identification information of the vehicle 4 to the server 3 through the wireless base station 6 and the communication network 5 in every given period. Each time the received image of the surrounding of the vehicle 4 is received, the server 3 may transfer the image to the terminal 2 of the user who requests vehicle allocation and may make the terminal 2 display the image. With this, since the user can confirm change in the surrounding situation viewed from the vehicle accompanied by the movement of the vehicle allocated for the user, the user more easily finds the vehicle allocated for the user.

Each of the vehicle 4 and the terminal 2 may have a wireless communication circuit (not shown) through which the vehicle 4 and the terminal 2 can perform direct communication with each other according to a predetermined short-distance wireless communication standard. In this case, in a case where the vehicle 4 receives the vehicle allocation instruction, the ECU 45 may make the wireless terminal 41 transmit information representing an access right for communication using the wireless communication circuit to the server 3 through the wireless base station 6 and the communication network 5. The server 3 may transfer the received information representing the access right to the terminal 2 of the user who requests vehicle allocation.

In this case, in a case where the terminal 2 and the vehicle 4 approach at a predetermined distance or less, the terminal 2 and the vehicle 4 may establish wireless communication connection using the wireless communication circuits and the access right. The display controller 62 may directly transmit the latest image of the surrounding of the vehicle 4 obtained by the outside-vehicle camera 44, and the like to the terminal 2 without passing through the server 3. In this case, a communication load of the communication network 5 and a processing load of the server 3 are reduced.

According to still another modification example, the vehicle 4 may have a speaker that is attached so as to emit toward the surrounding of the vehicle 4, along with the outside-vehicle display device 42 or instead of the outside-vehicle display device 42. The speaker is another example of an outside-vehicle notification unit. In this case, in a case where the display start determination unit 61 determines to start the display of the identification information for notification, the display controller 62 may make the speaker output the identification information for notification in a form of voice. To this end, for example, data, such as voice signals representing individual phonemes for use in synthesized voice signal generation, in the memory 52 in advance. The display controller 62 may synthesize, from text data included in the identification information for notification, voice signals corresponding to text data, for example, according to a predetermined voice synthesis method. Alternatively, the voice signals output from the speaker may be included in the identification information for notification. The display controller 62 may make the speaker output the voice signals. Even in the case, in a case where the vehicle 4 receives the highlighting instruction, the display controller 62 may change an aspect of a voice output of the identification information for notification from the speaker for a given period. For example, in a case where the vehicle 4 receives the highlighting instruction, the display controller 62 may increase the voice output of the identification information for notification from the speaker for the given period.

In the embodiment or the modification examples described above, the processor of the server 3 may execute the processing of the display start determination unit 61 based on the current position of the vehicle 4 received from the vehicle 4. In a case where the processor of the server 3 determines that a measurement value of the current position of the vehicle 4 is included within the predetermined range from the predicted boarding position included in the vehicle allocation request, the server 3 may transmit an instruction to make the outside-vehicle display device 42 display the identification information for notification to the vehicle 4 through the communication network 5 and the wireless base station 6. In the modification examples, the identification information for notification may be included in the instruction to make the outside-vehicle display device 42 display the identification information for notification.

A computer program that causes a computer to execute the notification processing executed by the processor 53 of the ECU 45 may be distributed, for example, in a state of being recorded on a recording medium, such as an optical recording medium or a magnetic recording medium.

As described above, those skilled in the art can make various alterations to the embodiments without departing from the spirit and scope of the present disclosure.

What is claimed is:

1. A vehicle that is boardable by a user, the vehicle comprising:
   a communication unit configured to receive identification information for notification set for the user;
   an outside-vehicle notification unit configured to perform notification by displaying the identification information to a surrounding of the vehicle; and
   a controller configured to:
      make the outside-vehicle notification unit perform the notification by displaying the identification information,
      determine whether a highlighting instruction has been received from the user after making the outside-vehicle notification unit perform the notification, and
      upon a determination that the highlighting instruction has been received make the outside-vehicle notification unit change to highlight the displaying of the identification information for a given period to assist the user in boarding the vehicle.

2. The vehicle according to claim 1, further comprising an imaging unit configured to image the surrounding of the vehicle to generate an image representing the surrounding, wherein the controller is configured to transmit the image to a terminal carried with the user through the communication unit.

3. The vehicle according to claim 1, further comprising a positioning unit configured to measure a position of the vehicle, wherein:
   the communication unit is configured to further receive a predicted boarding position of the user to the vehicle; and
   the controller is configured to, in a case where the measured position of the vehicle is included within a predetermined range from the predicted boarding position, make the outside-vehicle notification unit perform the notification of the identification information for notification to the surrounding of the vehicle.

4. The vehicle according to claim 1, wherein the controller is configured to, in a case where detection is made that the user boards the vehicle while the outside-vehicle notification unit is made to perform the notification of the identification information for notification to the surrounding of the vehicle, end the notification of the identification information for notification in the outside-vehicle notification unit.

5. The vehicle according to claim 1, wherein the controller is configured to end the notification in a case where the user has boarded the vehicle.

6. The vehicle according to claim 1, wherein the controller is configured to determine whether the highlighting instruction has been received from the user by determining whether the highlighting instruction has been received by a server which creates the highlighting instruction after receiving a highlighting request generated by a terminal.

7. A notification method in a vehicle that is boardable by a user, the notification method comprising:

receiving identification information for notification set for the user through a communication unit in the vehicle;

making an outside-vehicle notification unit, provided in the vehicle and configured to perform notification to a surrounding of the vehicle, perform notification of the identification information by displaying the identification information;

determining whether a highlighting instruction has been received from the user after making the outside-vehicle notification unit perform the notification; and upon a determination that the highlighting instruction has been received, changing to highlight the displaying of the identification information for a given period to assist the user in boarding the vehicle.

8. A vehicle that is boardable by a user, the vehicle comprising:

a communication unit configured to receive identification information for notification set for the user;

an outside-vehicle notification unit configured to perform notification by displaying the identification information to a surrounding of the vehicle; and a controller configured to:

make the outside-vehicle notification unit perform the notification by displaying the identification information, determine whether a highlighting instruction has been received from the user after making the outside-vehicle notification unit perform the notification, upon a determination that the highlighting instruction has been received and a current position of the vehicle is included within a predetermined range from a predicted boarding position, make the outside-vehicle notification unit change to highlight the displaying of the identification information for a given period to assist the user in boarding the vehicle, and upon a determination that the highlighting instruction has been received from the user and a current position of the vehicle is not included within the predetermined range from the predicted boarding position not make the outside-vehicle notification unit change to highlight the displaying of the identification information for a given period to assist the user in boarding the vehicle.

\* \* \* \* \*